United States Patent
Zhang et al.

(10) Patent No.: US 12,493,156 B2
(45) Date of Patent: Dec. 9, 2025

(54) RoF COMMUNICATION DEVICE WITH INTEGRATION OF RF CIRCUIT BOARD AND OPTICAL MODULE

(71) Applicant: Global Technology Inc., Ningbo (CN)

(72) Inventors: Na Zhang, Ningbo (CN); Fan Yang, Ningbo (CN); Qikun Huang, Ningbo (CN)

(73) Assignee: Global Technology Inc., Ningbo (CN)

( * ) Notice: Subject to any disclaimer, the term of this patent is extended or adjusted under 35 U.S.C. 154(b) by 223 days.

(21) Appl. No.: 18/179,788

(22) Filed: Mar. 7, 2023

(65) Prior Publication Data

US 2024/0201459 A1    Jun. 20, 2024

(30) Foreign Application Priority Data

Dec. 20, 2022   (CN) .......................... 202211638943.8

(51) Int. Cl.
*H04B 10/00*   (2013.01)
*G02B 6/42*   (2006.01)
*H04B 10/2575*   (2013.01)

(52) U.S. Cl.
CPC .......... *G02B 6/428* (2013.01); *G02B 6/4251* (2013.01); *G02B 6/4271* (2013.01); *H04B 10/2575* (2013.01)

(58) Field of Classification Search
None
See application file for complete search history.

(56) References Cited

U.S. PATENT DOCUMENTS

| | | | | |
|---|---|---|---|---|
| 9,236,945 | B2 * | 1/2016 | Ho | H04B 10/40 |
| 9,417,413 | B2 * | 8/2016 | Pfnuer | H04B 10/25891 |
| 9,419,717 | B2 * | 8/2016 | Huang | H04B 10/40 |
| 9,866,328 | B2 * | 1/2018 | Wang | G02B 6/42 |
| 10,230,470 | B2 * | 3/2019 | Lin | H05K 1/0218 |
| 10,514,515 | B2 * | 12/2019 | Lin | G02B 6/4246 |
| 11,616,575 | B2 * | 3/2023 | Li | H04J 14/0305 |
| | | | | 250/216 |
| 11,994,726 | B2 * | 5/2024 | Zhang | H04B 10/40 |
| 12,085,770 | B2 * | 9/2024 | Kang | G02B 6/4281 |
| 2012/0087136 | A1 * | 4/2012 | Kuwahara | H05K 1/118 |
| | | | | 361/679.01 |
| 2015/0003839 | A1 * | 1/2015 | Minota | G02B 6/4284 |
| | | | | 398/138 |
| 2015/0256259 | A1 * | 9/2015 | Huang | G02B 6/4261 |
| | | | | 398/139 |
| 2015/0304053 | A1 * | 10/2015 | Pfnuer | G02B 6/4215 |
| | | | | 398/212 |

(Continued)

*Primary Examiner* — Agustin Bello
(74) *Attorney, Agent, or Firm* — Grossman Tucker Perreault & Pfleger, PLLC

(57) ABSTRACT

A RoF communication device includes a RF circuit board and an optical module. The optical module includes a casing, a connection circuit board, an optical transmitting unit and an optical receiving unit. The casing is connected with the RF circuit board. The connection circuit board is accommodated in the casing. The optical transmitting unit is mounted on the connection circuit board. The optical receiving unit is mounted on the connection circuit board. The electrical interface of the RF circuit board is provided in the casing, and the optical transmitting unit and the optical receiving unit are electrically connected with the electrical interface.

8 Claims, 3 Drawing Sheets

(56) References Cited

U.S. PATENT DOCUMENTS

| | | | |
|---|---|---|---|
| 2016/0112137 A1* | 4/2016 | Pfnuer | H04B 10/503 |
| | | | 398/183 |
| 2016/0191166 A1* | 6/2016 | Wang | G02B 6/42 |
| | | | 398/135 |
| 2016/0286657 A1* | 9/2016 | Ban | H05K 3/363 |
| 2018/0287705 A1* | 10/2018 | Lin | G02B 6/12004 |
| 2019/0101714 A1* | 4/2019 | Kurashima | G02B 6/4277 |
| 2020/0288589 A1* | 9/2020 | Lavoie | H05K 7/20163 |
| 2020/0328815 A1* | 10/2020 | Li | H04B 10/615 |
| 2022/0003948 A1* | 1/2022 | Zhou | G02B 6/4279 |
| 2022/0247494 A1* | 8/2022 | Lee | G02B 6/428 |
| 2022/0326456 A1* | 10/2022 | Zhang | G02B 6/4292 |
| 2022/0404563 A1* | 12/2022 | Liu | H01S 5/0233 |
| 2023/0161098 A1* | 5/2023 | Bovington | G02B 6/0083 |
| | | | 385/92 |
| 2023/0194802 A1* | 6/2023 | Sun | H04B 10/673 |
| | | | 385/14 |
| 2023/0258883 A1* | 8/2023 | Zhang | G02B 6/4284 |
| | | | 385/15 |
| 2023/0354541 A1* | 11/2023 | Cole | H05K 7/10 |
| 2023/0375793 A1* | 11/2023 | Winzer | G02B 6/428 |
| 2024/0201459 A1* | 6/2024 | Zhang | G02B 6/4251 |
| 2024/0206129 A1* | 6/2024 | Cai | H05K 7/20418 |
| 2024/0219663 A1* | 7/2024 | Luo | G02B 6/4269 |
| 2024/0319460 A1* | 9/2024 | Huang | G02B 6/4246 |
| 2024/0369784 A1* | 11/2024 | Orsi | G02B 6/4269 |

\* cited by examiner

RoF COMMUNICATION DEVICE WITH INTEGRATION OF RF CIRCUIT BOARD AND OPTICAL MODULE

CROSS-REFERENCE TO RELATED APPLICATIONS

This application claims priority under 35 U.S.C. § 119(a) on Patent Application No(s). 202211638943.8 filed in China on Dec. 20, 2022, the entire contents of which are hereby incorporated by reference.

BACKGROUND

1. Technical Field

The present disclosure relates to optical communication, more particularly to a radio over fiber (RoF) configuration for optical communication.

2. Related Art

Optical modules are generally installed in electronic communication facilities in modern high-speed communication networks. With the improvement of optical communication system and the increase in demand of wide bandwidth for various network services, issues of insufficient internal space and high energy consumption of the conventional optical communication systems need to be tackled. Any solution to provide the small size optical communication systems at minimum expense of internal accommodation space and energy consumption without sacrificing both the bandwidth and transmission speed has been one of the important topics in this technical field.

Regarding the development of 5G and 6G networks in recent years, the high frequency signals with frequencies above 25 GHZ enjoy the advantages of wide bandwidth and fast transmission rate, while the high frequency signals also have some disadvantages such as short transmission distance and excessive attenuation. The high network coverage accomplished by dense distribution of 5G and 6G base stations may be a solution to these problems, though such arrangement comes with steeper price tags in connection with setup of 5G and 6G networks. For this reason, RoF technology is another solution that can improve network coverage and maintain construction cost at the same time.

SUMMARY

According to one aspect of the present disclosure, a RoF communication device includes a radio frequency (RF) circuit board and an optical module. The optical module includes a casing, a connection circuit board, an optical transmitting unit and an optical receiving unit. The casing is connected with the RF circuit board. The connection circuit board is accommodated in the casing. The optical transmitting unit is mounted on the connection circuit board. The optical receiving unit is mounted on the connection circuit board. The electrical interface of the RF circuit board is provided in the casing, and the optical transmitting unit and the optical receiving unit are electrically connected with the electrical interface.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

RoF technology generally refers to RF transmission. In a conventional optical module with RF signal transmission, the RF circuitry is usually electrically connected with the optical components via flexible circuit board to enable signal transmission, and the flexible circuit board allows for electrical connection interfaces at different heights, thus enhancing design flexibility. However, since the RoF system centralizes the functions of signal switching, signal control and signal modulation at the central station (CS), the RF circuitry in the optical module at the CS may be required to transmit both digital and analog signals. The connection of the RF circuitry with the optical components via flexible circuit board may suffer from severe signal transmission loss due to the overly long signal transmission path on the flexible circuit board and the material properties thereof, and crosstalk due to simultaneous presence of the digital and analog signals. On the other hand, based on the conventional configuration in which the optical components and the RF circuitry are separated from each other, during the manufacturing of the optical components, two ends of the flexible circuit board should be respectively bonded to the optical component and the rigid board with RF circuitry. Such configuration might only result in complicated manufacturing processes and therefore high manufacturing cost.

Figure 1:
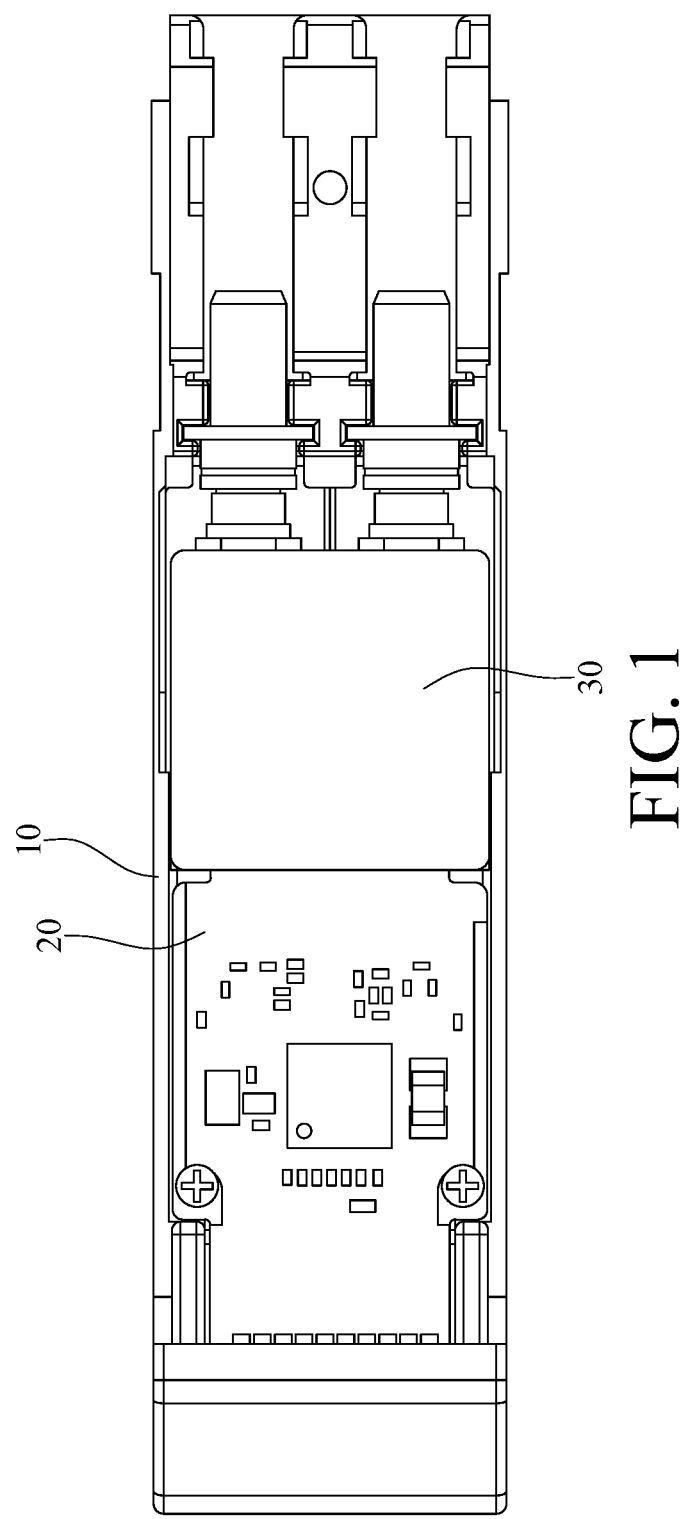
FIG. 1 is a top view of a RoF communication device according to one embodiment of the present disclosure.
Figure 2:
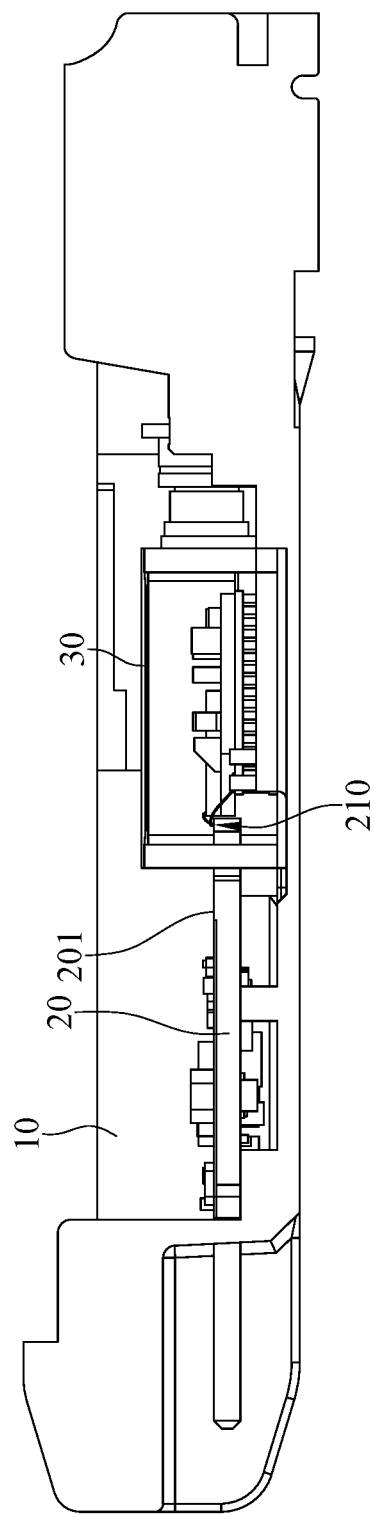
FIG. 2 is a cross sectional view of the RoF communication device in FIG. 1.

According to one embodiment of the present disclosure, a RoF communication device may include a RF circuit board and an optical module. Please refer to FIG. 1 and FIG. 2. FIG. 1 is a top view of a RoF communication device according to one embodiment of the present disclosure, and FIG. 2 is a cross sectional view of the RoF communication device in FIG. 1. In this embodiment, a RoF communication device 1 may include a housing 10, a RF circuit board 20 and an optical module 30.

The housing 10 may be a one-pieced housing, or include an upper cover and a bottom cover which are assembled together. A fiber connector or a heat dissipation member (not shown in the drawings) may be mounted on the housing 10. For the purpose of illustration, the upper cover of the housing 10 is omitted in FIG. 1 and FIG. 2.

The RF circuit board 20 may be a rigid circuit board including multiple sublayers and strip lines in the sublayers. The RF circuit board 20 may include a laser driver, a microcontroller unit, one or more TX (transmitted) signal transmission lines and one or more RX (received) signal transmission lines. The laser driver is communicated with the TX signal transmission lines and an optical transmitter.

The RX signal transmission lines are communicated with an optical receiver. The microcontroller unit is provided to communicate with the laser driver, the optical transmitter and the optical receiver for signal control and processing. Moreover, the RF circuit board 20 may further include an electrical interface 210 at the top surface 201 of the RF circuit board 20.

Figure 3:
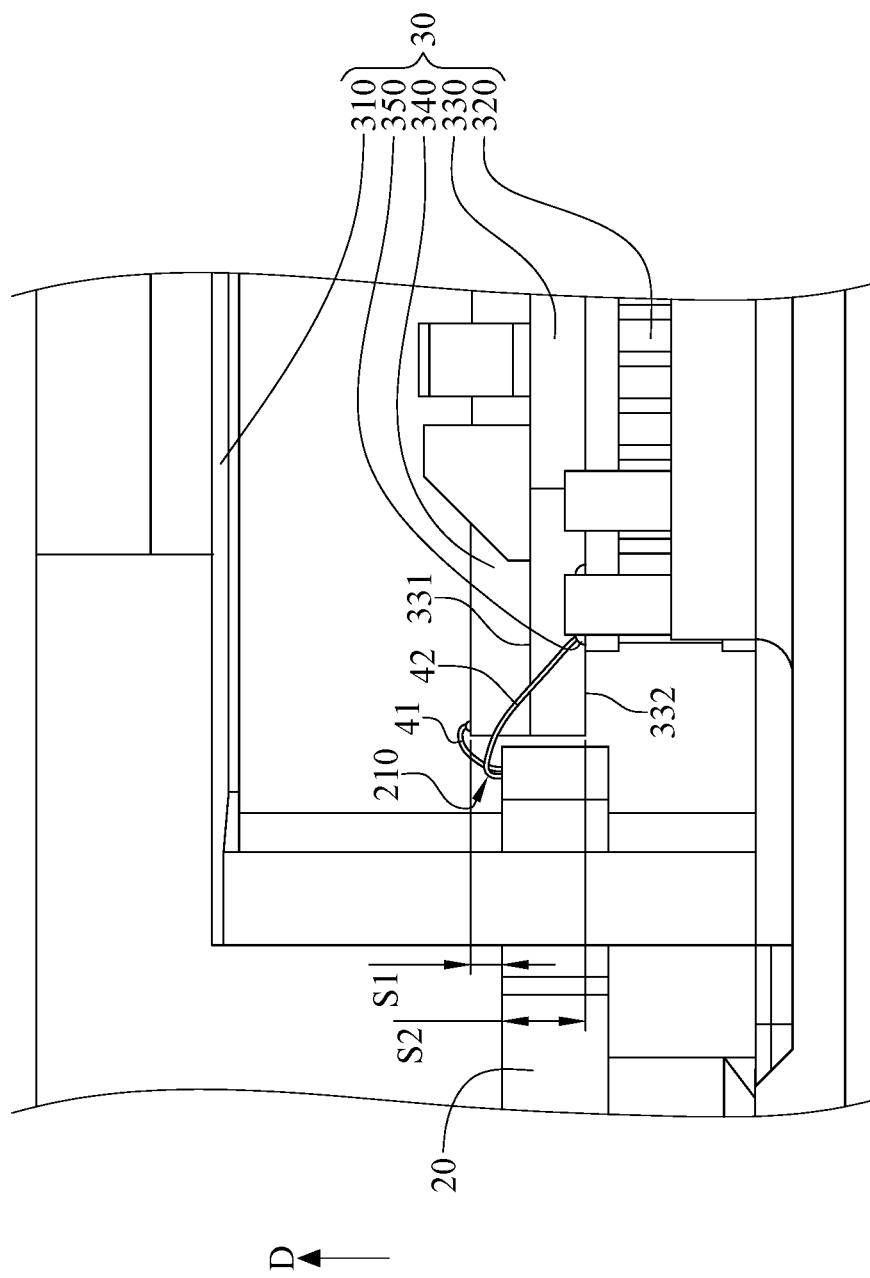
FIG. 3 is a partially enlarged view of the RoF communication device in FIG. 2.

Please further refer to FIG. 3. FIG. 3 is a partially enlarged view of the RoF communication device in FIG. 2. The optical module 30 may include a casing 310, a thermoelectric cooler 320, a connection circuit board 330, an optical transmitting unit 340 and an optical receiving unit 350. The casing 310 may be connected with the RF circuit board 20. The thermoelectric cooler 320, the connection circuit board 330, the optical transmitting unit 340 and the optical receiving unit 350 may be accommodated in the casing 310. The connection circuit board 330 may be mounted on the thermoelectric cooler 320, and the optical transmitting unit 340 and the optical receiving unit 350 may be mounted on the connection circuit board 330. More specifically, the optical transmitting unit 340 and the optical receiving unit 350 may be mounted on the top surface 331 and the bottom surface 332 of the connection circuit board 330, respectively.

The optical transmitting unit 340 may be a laser emitter or a transmitter optical subassembly (TOSA). The optical receiving unit 350 may be a photodiode or a receiver optical subassembly (ROSA). In a condition that each of the optical transmitting unit 340 and the optical receiving unit 350 is an optical subassembly, the optical transmitting unit 340 and/or the optical receiving unit 350 may further include a lens, a wavelength division multiplexer, an optical modulator, a beam splitter or a transimpedance amplifier in addition to the active components (the laser emitter and/or the photodiode). Also, the number of the optical transmitting unit 340 and the optical receiving unit 350 may each be one or more.

The electrical interface 210 of the RF circuit board 20 may be provided in the casing 310. Specifically, a portion of the RF circuit board 20 may be sealed within the casing 310 so that the electrical interface 210 and said portion thereof are both located within the casing 310.

The optical transmitting unit 340 and the optical receiving unit 350 may be electrically connected with the electrical interface 210. Specifically, the optical transmitting unit 340 and the optical receiving unit 350 are electrically connected with the electrical interface 210 by wire bonding. As shown in FIG. 3, the optical transmitting unit 340 is electrically connected with the electrical interface 210 via a gold wire 41, and the optical receiving unit 350 is electrically connected with the electrical interface 210 via another gold wire 42.

In this embodiment, in a thickness direction D of the RF circuit board 20, the distance between the optical transmitting unit 340 and the electrical interface 210 may be different from the distance between the optical receiving unit 350 and the electrical interface 210. As shown in FIG. 3, the vertical distance S1 between the optical transmitting unit 340 and the electrical interface 210 is different from the vertical distance S2 between the optical receiving unit 350 and the electrical interface 210. More specifically, the vertical distance S1 may be smaller than the vertical distance S2. In other words, the electrical interface 210 may be closer to the optical transmitting unit 340 in the thickness direction D of the RF circuit board 20.

In this embodiment, the casing 310 may be an airtight casing. Specifically, the airtight casing may refer to full hermetic seal and near full hermetic seal (almost full hermetic seal). In case of full hermetic seal, the casing 310 may be a glass casing, a metal casing or a ceramic casing for encapsulation, and the RF circuit board 20 may be welded to the casing 310. In case of near full hermetic seal, the casing 310 may be an epoxy casing for encapsulation, and a solder, for example but not limited to glass solder or metal solder, may be provided between the RF circuit board 20 and the casing 310.

According to one embodiment of the present disclosure, the RF signals received by, for example, a remote radio unit (RRU, commonly known as top of base station) can be modulated by the RF circuit board 20 and then converted to optical signals by the optical transmitting unit 340. On the other hand, the optical receiving unit 350 may receive the optical signals from a baseband unit (BBU, commonly known as bottom of base station) and then convert the optical signals to RF signals before the RF signals are input into the RF circuit board 20. The RF circuit board 20 modulates the RF signals, and an antenna of the RRU transmits the modulated RF signals. The aforementioned RF signals may be digital, analog or a mix of both digital and analog signals.

The exemplary embodiment in FIG. 1 through FIG. 3 demonstrates a RoF communication device 1 in a one-receiver-one-transmitter (1T1R) configuration, but the present disclosure is not limited thereto. Depending on the requirement of transmission rate, a two-transceiver-two-transmitter (2T2R) configuration, a four-transceiver-four-transmitter (4T4R) configuration, and other configurations may also be available.

According to one embodiment of the present disclosure, the electrical interface 210 of the RF circuit board 20 may be provided inside the casing 310 so that the RF circuit board and the casing 310 are configured in a hermetic sealing structure. It is helpful to prevent unfavorable influence on the signal transmission efficiency by temperature variation or moisture.

According to one embodiment of the present disclosure, the electrical interface 210 of the RF circuit board 20 may be provided inside the casing 310, and the electrical interface 210 may be electrically connected with the optical active components (the optical transmitting unit 340 and the optical receiving unit 350) which are also encapsulated in the casing 310. The RF circuit board 20 is encapsulated in the casing 310 with the optical active components to realize the integration of optical transceiver and signal processing transmission. Furthermore, the RF circuit board 20 may be directly encapsulated in the casing 310, which is helpful to shorten the signal transmission distance between the RF circuit board and the optical active components and reduce crosstalk, thereby reducing the transit loss between the optical active components and the RF circuit board 20.

According to the present disclosure, the electrical interface of the RF circuit board is provided inside the airtight casing, so that the RF circuit board and the casing are configured into a hermetic sealing structure. Therefore, it is helpful to prevent unfavorable influence on the signal transmission efficiency by temperature variation or moisture. In addition, the electrical interface of the RF circuit board is provided inside the casing 310, and the electrical interface is electrically connected with the optical active components (the optical transmitting unit and the optical receiving unit) which are also encapsulated in the casing. Therefore, it is helpful to shorten the signal transmission distance between the RF circuit board and the optical active components and reduce crosstalk, thereby reducing the transit loss between the optical active components and the RF circuit board. Further, the wire bonding connection between the optical active components and the RF circuit board is helpful to reduce the signal transmission distance between the optical active components and the RF circuit board.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. A radio over fiber (RoF) communication device, comprising:
   a housing;
   a radio frequency (RF) circuit board accommodated in the housing; and
   an optical module accommodated in the housing, comprising:
      a casing, connected with the RF circuit board;
      a connection circuit board, accommodated in the casing and separate from the RF circuit board;
      an optical transmitting unit, mounted on the connection circuit board; and
      an optical receiving unit, mounted on the connection circuit board;
   wherein the RF circuit board is a rigid circuit board, an electrical interface of the rigid circuit board is hermetically sealed in the casing and at least a portion of the rigid circuit board is outside the casing, and the optical transmitting unit and the optical receiving unit both mounted on the connection circuit board are electrically connected with the electrical interface of the rigid circuit board inside the casing.

2. The RoF communication device according to claim 1, wherein the optical transmitting unit and the optical receiving unit are mounted on a top surface and a bottom surface of the connection circuit board, respectively.

3. The RoF communication device according to claim 1, wherein the optical transmitting unit and the optical receiving unit are electrically connected with the electrical interface by wire bonding.

4. The RoF communication device according to claim 1, wherein a distance between the optical transmitting unit and the electrical interface is different from a distance between the optical receiving unit and the electrical interface in a thickness direction of the RF circuit board.

5. The RoF communication device according to claim 4, wherein the distance between the optical transmitting unit and the electrical interface is smaller than the distance between the optical receiving unit and the electrical interface in the thickness direction of the RF circuit board.

6. The RoF communication device according to claim 1, wherein the optical module further comprises a thermoelectric cooler, and the connection circuit board is mounted on the thermoelectric cooler.

7. The RoF communication device according to claim 1, wherein the electrical interface is on a top surface of the rigid circuit board.

8. The RoF communication device according to claim 1, wherein the rigid circuit board is directly encapsulated within the casing.

* * * * *